(12) United States Patent
Pace

(10) Patent No.: US 11,699,929 B2
(45) Date of Patent: Jul. 11, 2023

(54) ROTOR OF A VARIABLE-RELUCTANCE SYNCHRONOUS MOTOR

(71) Applicant: DANA TM4 ITALIA S.R.L., Arzignano (IT)

(72) Inventor: Alberto Pace, Arzignano (IT)

(73) Assignee: DANA TM4 ITALIA S.R.L., Arzignano (IT)

( * ) Notice: Subject to any disclaimer, the term of this patent is extended or adjusted under 35 U.S.C. 154(b) by 19 days.

(21) Appl. No.: 16/123,777

(22) Filed: Sep. 6, 2018

(65) Prior Publication Data
US 2019/0081522 A1 Mar. 14, 2019

(30) Foreign Application Priority Data

Sep. 8, 2017 (IT) .......................... 102017000100814

(51) Int. Cl.
*H02K 1/27* (2022.01)
*H02K 1/24* (2006.01)
(Continued)

(52) U.S. Cl.
CPC ............. *H02K 1/246* (2013.01); *H02K 1/276* (2013.01); *H02K 15/02* (2013.01); *H02K 16/00* (2013.01);
(Continued)

(58) Field of Classification Search
CPC ........ H02K 1/276; H02K 1/246; H02K 16/00; H02K 16/02; H02K 2213/12; H02K 19/103; H02K 1/2766
(Continued)

(56) References Cited

U.S. PATENT DOCUMENTS

| 5,864,191 A * | 1/1999 | Nagate | ................... | H02K 1/276 |
| | | | | 310/216.106 |
| 2007/0205689 A1* | 9/2007 | Nemoto | ................. | H02K 29/03 |
| | | | | 310/156.53 |

(Continued)

FOREIGN PATENT DOCUMENTS

CN 103430430 A 12/2013
EP 2 693 605 2/2014
(Continued)

OTHER PUBLICATIONS

IT201700100814, May 9, 2018, Search Report and Written Opinioin.
(Continued)

*Primary Examiner* — Michael Andrews
(74) *Attorney, Agent, or Firm* — McCoy Russell LLP

(57) ABSTRACT

A process for assembling a rotor of a variable-reluctance synchronous motor, characterised in that it comprises the steps of:
  i. preparing a plurality of discs having a through-cavity for each polar sector for housing at least a magnet;
  ii. positioning the discs in sequence along an axis of rotation for forming the rotor, so that the through-cavities are aligned to one another;
  iii. preparing magnets having an identical depth that is smaller than the depth of the rotor, and a frontal section that is identical to or smaller than the area of the cavity;
  iv. calculating the number of magnets to be inserted, for each polar sector, in a sequence so as to occupy only part of the total depth of the rotor as a function of the performances to be obtained;
  v. inserting the calculated number of magnets in a series of cavities aligned for each polar sector.

(Continued)

The invention also relates to a rotor of a variable-reluctance synchronous motor assembled using the process set out above.

10 Claims, 4 Drawing Sheets

(51) Int. Cl.
  *H02K 19/10* (2006.01)
  *H02K 15/02* (2006.01)
  *H02K 16/02* (2006.01)
  *H02K 1/276* (2022.01)
  *H02K 16/00* (2006.01)

(52) U.S. Cl.
  CPC ........... *H02K 16/02* (2013.01); *H02K 19/103* (2013.01); *H02K 2213/12* (2013.01)

(58) Field of Classification Search
  USPC .......................................... 310/261.1, 156.53
  See application file for complete search history.

(56) References Cited

U.S. PATENT DOCUMENTS

| | | | | |
|---|---|---|---|---|
| 2008/0224558 A1* | 9/2008 | Ionel | .................... | H02K 1/2766 310/156.57 |
| 2008/0278021 A1* | 11/2008 | Ley | ..................... | H02K 1/2766 310/156.53 |
| 2013/0026872 A1* | 1/2013 | Cirani | .................. | H02K 1/2766 310/156.08 |
| 2014/0021820 A1* | 1/2014 | Kondou | ................. | H02K 1/276 310/156.53 |

FOREIGN PATENT DOCUMENTS

| | | |
|---|---|---|
| JP | H11 89145 | 3/1999 |
| JP | 2004 088852 | 2/2014 |
| WO | WO 2015/092672 | 6/2015 |

OTHER PUBLICATIONS

China National Intellectual Property Administration, Office Action and Search Report Issued in Application No. 201810974565.8, dated Dec. 29, 2021, 12 pages.

\* cited by examiner

ROTOR OF A VARIABLE-RELUCTANCE SYNCHRONOUS MOTOR

TECHNICAL FIELD

The present invention relates to a process for assembling a rotor of a variable-reluctance synchronous motor and the rotor.

In particular, the invention relates to the optimisation of the step of arranging the magnets in the rotor in order to improve the performance of the motor, when the variable-reluctance of the motor alone is not sufficient to deliver the operational demands.

PRIOR ART

Variable-reluctance synchronous motors are defined as "electric motors" as the application of a potential difference on a stator generates the movement of a rotor.

This is due to the structural magnetic anisotropy of the rotor, which comprises sections having a minimum reluctance into which the magnetic flow for generating the rotary movement is channeled.

More specifically, according to the prior art, rotors of this type are formed by an assembly of discs, usually called "laminations", placed side-by-side along an axis of rotation of the rotor itself.

Each lamination has a magnetic structure divided into polar sectors, defining the number of magnetic poles, wherein each of them has a minimum reluctance direction, also defined as the "d" or direct axis, and a maximum reluctance direction, also defined as the "q" or quadrature axis.

When alternating currents are applied to the cables of the stator windings, a rotating magnetic field is produced and the rotor tends to align the "d" axis of each pole with the corresponding peak of the field generated by the stator in order to realise the rotation of the rotor in a synchronised way, obtaining the desired motor torque.

However, there are uses in which the performance generated by only the variable-reluctance is not sufficient to satisfy the demand of applications.

To meet these demands, the rotors are provided with magnets housed in cavities present in each polar sector of each lamination.

The magnets, which are able to intensify the magnetic field lines of the lamination, have a width that is variable according to the performances demanded and are inserted in the rotor for the whole depth thereof.

FIGS. 1 and 2 illustrate two rotors assembled according to the prior art in frontal section. In the first, illustrated in FIG. 1, the magnets inserted for the whole depth of the rotor have a complementarily-shaped section to the cavity present on the laminations, giving the motor maximum levels of performance. In the second rotor, illustrated in FIG. 2, the magnets have a width that is halved with respect to the above-described magnets, but are however inserted for the whole depth of the rotor, giving the motor levels of performance that are half those of the preceding case.

However, this known technique has some drawbacks which the present invention intends to obviate.

A first drawback is linked to the insertion of the magnets for the whole length of the rotor. This operation requires a certain amount of time due to the high number of magnets to be inserted, to which is added the operational issue deriving from pushing the magnet down along the whole depth of the motor. This includes an increase in production stage costs, making a version of the motor with few magnets unattractive, as the decisions tend to be made on the basis of production costs rather than the cost of the magnet itself.

In the prior art, therefore, the producer encounters a further drawback, as it must have available magnets of different widths in order to be able to build motors having differing performance according to the application thereof or on the request of the customer, as it has to store large quantities of magnets of different dimensions with the complications that ensue, such as the possible deterioration of the magnet itself.

SUMMARY

In this context, an aim of the present invention is to describe a process for assembling a rotor of a variable-reluctance synchronous motor, and the rotor thus assembled, in such a way as to obviate the above-cited drawbacks.

In particular an aim of the present invention is to make available an assembly process of a rotor for a variable-reluctance synchronous motor that is simplified with respect to the prior art, in such a way as to be able to reduce the production costs as well as the time required for replacement of the components with the purpose of varying the performances according to demand.

Further, another aim of the invention is to reduce waste of materials caused by the large variety of components, which, usually, must be kept in a store and deteriorate over time, or are never used. The consequent increase in management costs reflects on the final price of the product.

The defined aims are generally attained by a process comprising the technical characteristics set down in one or more of the claims appended to the present description.

The present invention relates to the process for assembling a rotor of a variable-reluctance synchronous motor, characterised in that it comprises steps of:

i. preparing a plurality of discs, or laminations, wherein each disc has at least a through-cavity for each polar sector for housing at least a magnet;

ii. positioning a plurality of discs in sequence along an axis of rotation for forming the rotor, so that said through-cavities are aligned to one another in a parallel direction to said axis of rotation;

iii. preparing a plurality of said magnets with a predefined depth that is identical for at least a part of said magnets and smaller than the total depth of the rotor and having a section area, according to a plane that is perpendicular to the direction of said axis of rotation, that is equal to or smaller than the access area of said through-cavity;

iv. calculating the number of magnets to be inserted, for each polar sector, in a sequence along said direction parallel to said axis of rotation, so as to occupy only part of the total depth of the rotor as a function of predetermined motor torque performances which are to be obtained;

v. inserting the calculated number of magnets in at least a through-cavity of each polar sector so as to occupy the aligned through-cavities of a plurality of discs arranged in sequence up to obtaining the depth defined by the calculated number of magnets.

Substantially, once the rotor has been prepared by aligning the holed discs, usually known as laminations, and once the desired motor torque has been defined, an operator prepares the necessary number of magnets in order to house the magnets through the aligned cavities of the discs so as to reach the predetermined performance.

The insertion step preferably includes each polar sector having a plurality of cavities suitable for housing the magnets. In this way the insertion of further magnets is facilitated in order to further modify, and in the specific case increase, the performance rendered by the motor.

The insertion step preferably includes the magnets being arranged symmetrically with respect to the axis of rotation in each disc in order to maintain the structure in balance.

According to an aspect of the invention, the step of preparing a plurality of said magnets includes preparing magnets having a predefined depth that is identical for all the magnets or having a depth that is a multiple or sub-multiple of said predefined depth. In particular, the magnets inserted in the start and end discs of the rotor have a depth that is smaller (preferably a sub-multiple) with respect to the magnets inserted in the most internal zone so as to optimise the performance of the motor.

According to an aspect of the invention, the step of preparing the discs includes preparing a predefined module and the module comprises a predetermined number of said discs. Further, the process comprises a step of realising "magnetised" modules in which magnets are inserted in the cavities of every polar sector, and "empty" modules in which there will be no magnets present. The "magnetised" modules and the "empty" modules are advantageously mutually interchangeable as a function of the motor torque performances that are to be obtained.

According to a further aspect of the invention, the calculation step enables obtaining the number of "magnetised" modules to be used for realising the rotor according to the torque performances that are to be obtained, arranging them in sequence with at least an "empty" module useful for completing the rotor.

In this way it is more advantageous to modify the structure of the rotor to reduce or increase the performance of the motor, as it is sufficient to replace one module with another, differently configured, instead of performing the insertion or removal or each single magnet.

The insertion step preferably includes each magnet being inserted in at least one of these through-cavities for each polar sector. The magnets conveniently have a complementarily-shaped section area with respect to the access area of the plurality of through-cavities.

The present invention further relates to the rotor of a variable-reluctance synchronous motor, which comprises a plurality of discs arranged in sequence along an axis of rotation and each being angularly sub-divided into a plurality of polar sectors, which have at least a through-cavity for housing at least a magnet. Each magnet that has been used has a same predefined depth, the depth being smaller than the total depth of the rotor and having a section area that is equal to or smaller than the access area to the through-cavity. In this way, the rotor is configurable between a condition in which a magnet is inserted in each polar sector to a first depth that is smaller than the total depth of the rotor and a configuration in which a plurality of magnets is inserted in sequence along a parallel direction to said axis of rotation to a second depth that is smaller than the total depth of the rotor as a function of the performances of the motor which are to be obtained.

The magnets are preferably arranged symmetrically with respect to the axis of rotation. In this way the structure is balanced, thus preventing possible phase shifts between the rotational movement of the rotor and the pulse supplied by the stator windings.

In an alternative embodiment, the magnets are arranged asymmetrically with respect to the axis of rotation, for example for cases of special applications. In this case, in order to distribute the weight homogeneously it is possible to insert non-magnetic balancing weights in some zones of the rotor.

According to an aspect of the invention, the polar sectors comprise a plurality of through-cavities for the housing of the magnets. In this way the introduction of further magnets for increasing motor performance is simplified.

According to a further aspect of the invention, a sub-group of discs arranged in sequence along said parallel direction to said axis of rotation defines a module configurable between a first "empty" configuration in which the module is lacking said magnets and a second "magnetised" configuration in which the module contains at least one of said magnets for each polar sector. In this way, the rotor is formed by a variable number of modules in "empty" configuration and a variable number of modules in "magnetised" configuration as a function of the performances of the motor that are to be obtained. It is advantageously sufficient to replace a module with another, differently configured, to reduce or increase the performance of the motor torque.

Each of said magnets preferably has a complementarily-shaped section area with respect to the opening the through-cavities.

Note that each magnet has a frontal section area having a width and height that might be different with respect to another magnet of the same motor so as to optimise the performance of the motor.

The through-cavities of each lamination have a width and height that are different to one another, so that the magnets adapt to the dimensions and, in the preferred case, are complementarily-shaped to the respective cavities.

According to a further aspect of the invention, the through-cavities are arranged along a radial axis of maximum reluctance and the polar sectors are defined between two consecutive radial axes of minimum reluctance.

BRIEF DESCRIPTION OF THE DRAWINGS

Further characteristics and advantages of the present invention will become more apparent from the indicative and thus non-limiting description of a preferred, but not exclusive, embodiment of a rotor of a variable-reluctance synchronous motor, as illustrated in the accompanying drawings, in which.

In the following description, the identical reference numerals indicate parts that are identical or corresponding in the various views.

DETAILED DESCRIPTION

Figure 1:
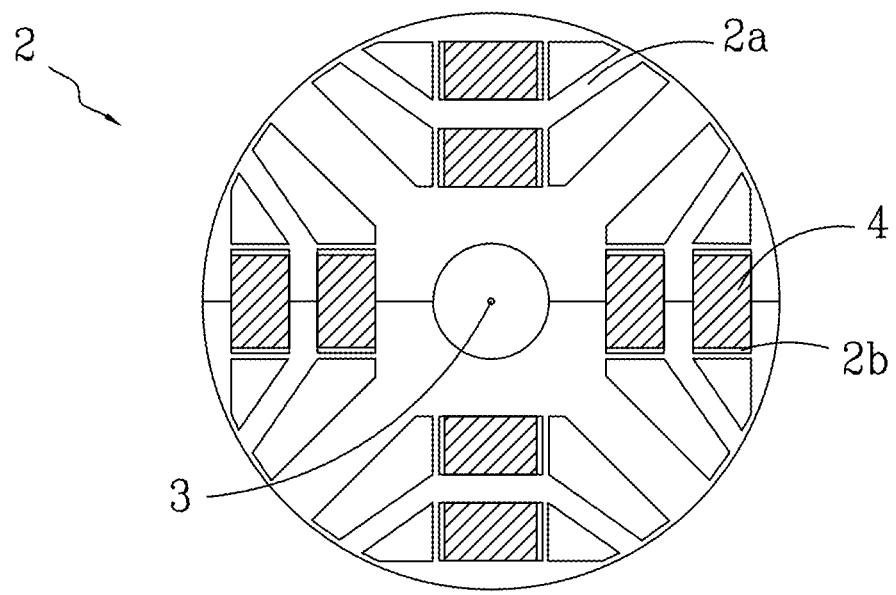
FIG. 1 is a schematic front view of a first configuration of the rotor lamination according to the prior art.
Figure 2:
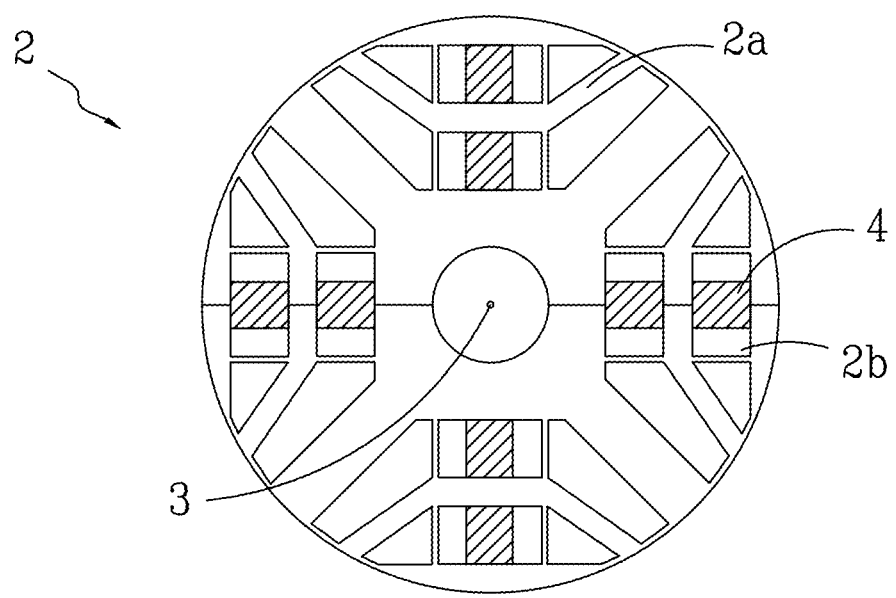
FIG. 2 is a schematic front view of a second configuration of the rotor lamination according to the prior art.
Figure 3:
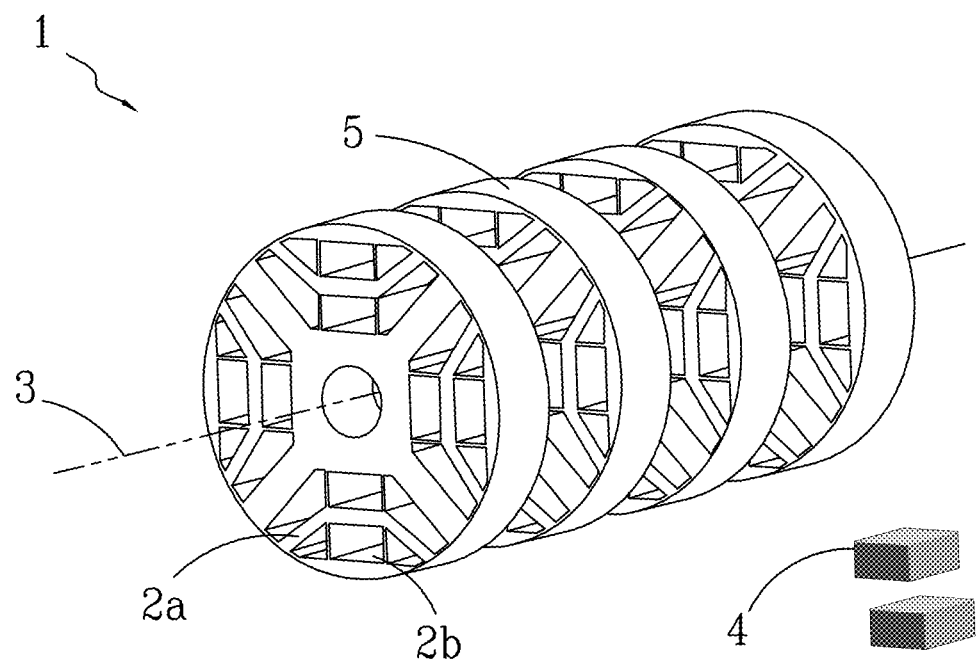
FIG. 3 is a perspective view of a rotor lacking magnets according to the present invention.
Figure 4:
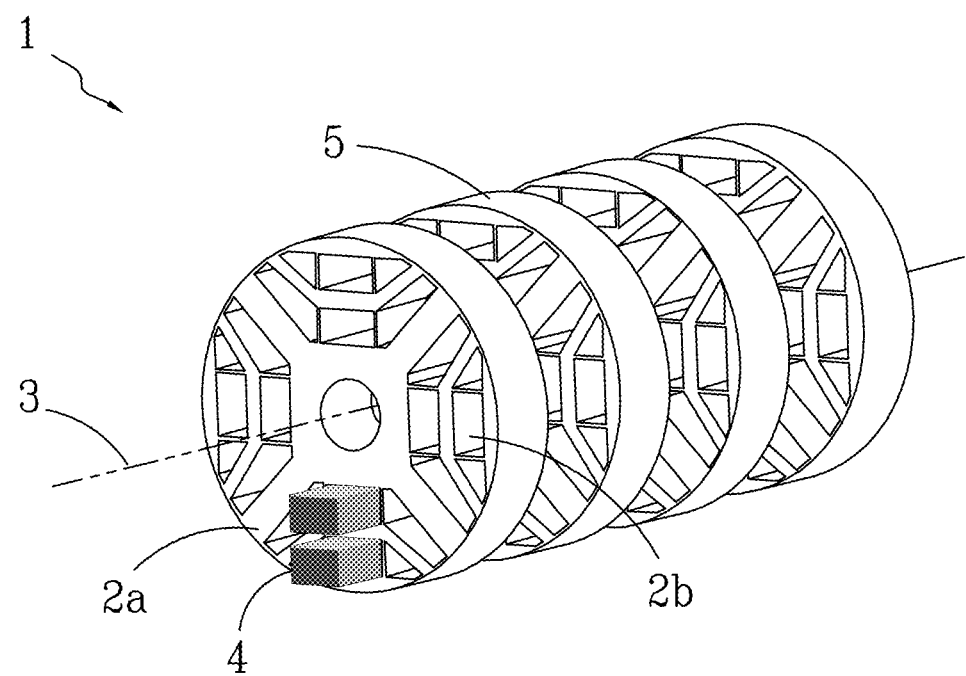
FIG. 4 is a perspective view of a rotor during the step of inserting magnets according to the present invention.

The present invention relates to the technical field of the assembly of a rotor for a variable-reluctance synchronous motor, and specifically to the optimisation of the step of arranging the magnets internally of the rotor and the rotor thus-assembled.

With reference to the figures mentioned, the number 1 generally denotes a rotor for a variable-reluctance synchronous motor according to the present invention.

The process for assembling the rotor 1 of a variable-reluctance synchronous motor is characterised in that it comprises the steps of:
i. preparing a plurality of discs 2, usually known as laminations, wherein each disc 2 has at least a through-cavity 2b for each polar sector 2a for housing at least a magnet 4;
ii. positioning a plurality of discs 2 in sequence along an axis of rotation 3 for forming the rotor 1, so that said through-cavities 2b are aligned to one another in a parallel direction to said axis of rotation 3;
iii. preparing a plurality of magnets 4 with a predefined depth that is identical for all the magnets and smaller than the total depth of the rotor 1 and having a section area, according to a plane that is perpendicular to the direction of said axis of rotation 3, that is equal to or smaller than the access area of said through-cavity 2b;
iv. calculating the number of magnets 4 to be inserted, for each polar sector 2a, in a sequence along said direction parallel to said axis of rotation 3, so as to occupy only a part of the total depth of the rotor 1 as a function of predetermined motor torque performances which are to be obtained;
v. inserting the calculated number of magnets 4 in at least a through-cavity 2b of each polar sector 2a so as to occupy the aligned through-cavities 2b of a plurality of discs 2 arranged in sequence up to obtaining the depth defined by the calculated number of magnets.

With reference to the last step of the process, the insertion of the magnets 4 into the through-cavities 2b of the discs 2 is illustrated from image 3 to image 6.

Figure 7:
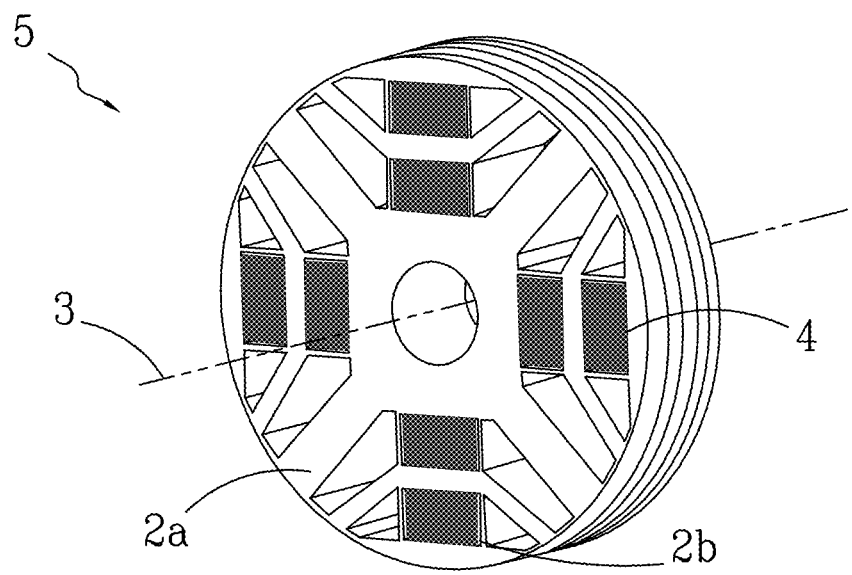
FIG. 7 is a perspective view of a module of the rotor according to the present invention in which the laminations forming the rotor are highlighted.

As illustrated in FIG. 7, the discs 2 can have a plurality of through-cavities 2b for each polar sector 2a, so that the insertion step through the aligned through-cavities 2b of the discs 2 arranged in sequence along the rotation axis 3 of the rotor 1 of the magnets 4 includes the magnets preferably being arranged in at least one of the plurality of through-cavities 2b for each polar sector 2a and, further, symmetrically with respect to the rotation axis 3 of the rotor 1.

In the appended figures, for each polar sector 2a two through-cavities 2b are present, substantially arch-shaped, each of which, like in the prior art, has bridges arranged parallel so as to stiffen the structure and delimit the zone in which to insert the magnets 4. Different to what is illustrated in the appended figures, each of said cavities 2b might have frontal dimensions having a height and width that are different according to the design data.

To facilitate the insertion operation, the perimeter of the area of the frontal section of the magnets 4, i.e. the perimeter of the area of the section defined according to a perpendicular plane to the direction of said axis of rotation 3 is complementarily-shaped with respect to the perimeter of the access area of the plurality of through-cavities 2b.

Alternatively, in order to simplify the insertion step and consequently vary the performance of the motor, one of the two dimensions of the perimeter of the frontal section of the magnets 4 to be used, can be smaller at the respective dimension of the perimeter of the access area of the through-cavity 2b.

In other alternatives, the dimensions of the magnets 4 of a same motor might be different in frontal height and width according to design needs.

Further, FIG. 7 shows how the step of arranging the discs 2 in sequence determines modules 5, i.e. subgroups of discs 2 which can be replaced to vary the performance of the motor torque on the basis of values that are to be reached. A module 5 can be differentiated between an "empty" configuration, in which magnets 4 are not present, and a "magnetised" configuration, in which there is at least one magnet 4 for at least one through-cavity 2b of each polar sector 2a. While in the first case a module 5 is made up of at least one disc 2, in this last case the depth is determined by the depth of the magnets 4 used. In fact, during the step of preparation, the magnets are dimensioned in such a way that the depth thereof is a multiple of the thickness of a single disc 2, so that it can cross a predefined plurality of through-cavities 2b and, consequently, an equal plurality of discs 2, thus creating together with the discs a surface free of steps.

A module 5 in the "empty" configuration preferably comprises a same number of discs 2 as a module 5 in the "magnetised" configuration, so that the two configurations of modules 5 are easily interchangeable, as they have to respect a predefined depth of the rotor 1, and so as to obtain a rotor structure that is better balanced.

Figure 5:
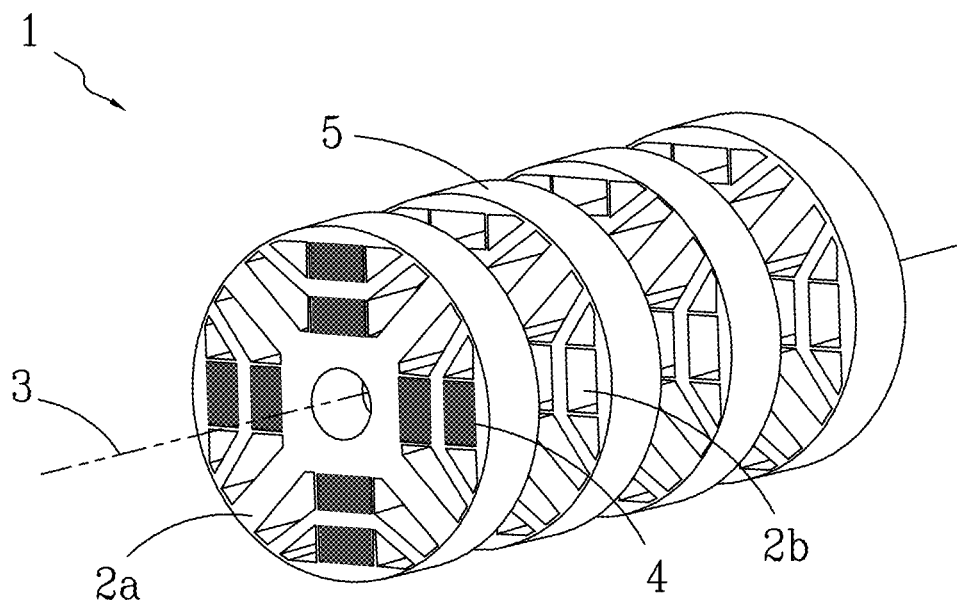
FIG. 5 is a perspective view of a rotor in which only a first module of the motor comprises magnets according to the present invention.
Figure 6:
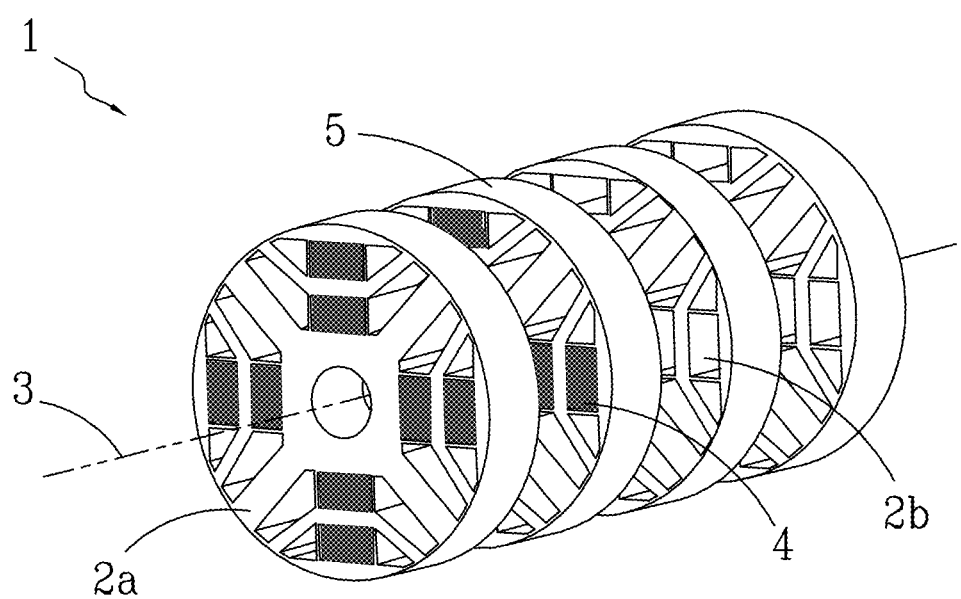
FIG. 6 is a perspective view of a rotor in which more than one module of the motor comprises magnets according to the present invention.

In practice, the modules 5 are of two types, on the basis of the presence or the absence of the magnets 4, and a variable number of both is arranged in sequence for the formation of the rotor 1. In FIG. 5 and FIG. 6 the rotor 1 comprises four modules 5: in the first case a "magnetised" module 5 is followed by three "empty" modules 5, while in the second case two "magnetised" modules 5 and two "empty" modules 5 are present.

The invention further relates to a rotor 1 of a variable-reluctance synchronous motor assembled using the process se t out above.

The rotor 1 extends along an axis of rotation 3 where a plurality of discs 2 is arranged in sequence, which are angularly sub-divided into a plurality of polar sectors 2a, each of which has at least one through-cavity 2b for housing at least a magnet 4.

In the preferred embodiment, the magnets 4 used have a predefined depth that is identical for all and smaller than the total depth of the rotor 1, dimensioned in such a way that the value thereof is a multiple of the depth of a single disc 2. Alternatively (not illustrated in the appended figures) the depth of some magnets 4 of the same rotor 1 might be smaller or greater than the predefined depth. In this case, the depth of some magnets 4 might preferably be a multiple or sub-multiple of said predefined depth. In particular, the magnets inserted in the start and end discs of the rotor have a depth that is smaller (preferably a sub-multiple) with respect to the magnets inserted in the most internal zone so as to optimise the performance of the motor.

Figure 8:
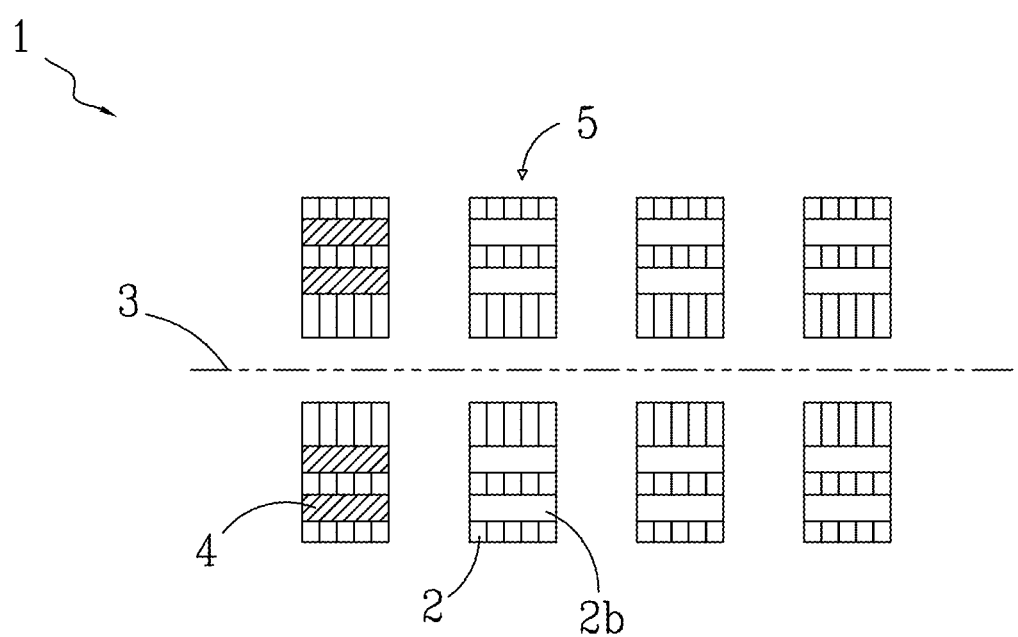
FIG. 8 illustrates, in a schematic lateral view, a section of the rotor of FIG. 5 according to the process set out in the description, according to a vertical plane located along the axis of rotation of the rotor.

Further, the magnets 4 have a frontal section area, i.e. the area of the section defined according to a perpendicular plane to the direction of the axis of rotation 3 of the rotor 1, smaller than the access area to the through-cavity 2b, so that a magnet 4 is inserted to a first depth that is smaller than the total depth of the rotor 1 through the sequence of discs 2 forming the rotor 1 for each polar sector 2a or a plurality of magnets 4 is inserted in sequence along a parallel direction to said axis of rotation 3 to a second depth that is also smaller than the total depth of the rotor 1, as a function of the performances of the motor which are to be obtained, as illustrated in FIG. 8.

A disc 2, because of how it is structured, has two radial axes of reference: a radial axis of maximum reluctance and a radial axis of minimum reluctance, respectively defined as axis "q" and axis "d". The through-cavities 2b are arranged along axis "q", while the polar sectors 2a are defined between two consecutive axes "d".

For each polar sector 2a, a plurality of cavities 2b is preferably present in which it is possible to insert a magnet 4, which, during the insertion step, will be arranged symmetrically with respect to the axis of rotation 3 of the rotor 1 and at least one of them in at least a cavity 2b of each polar sector 2a.

The dimensions of the magnets 4 used contribute to reaching the demanded motor torque performance, and consequently the front section is identical for all the magnets 4 used and, preferably, it is complementarily-shaped with respect to the passage area of the cavities 2b present on each disc 2.

Alternatively, one of the two dimensions of the frontal section of the magnets 4 can be smaller than the corresponding dimension of the through-cavity 2b of the disc 2.

For the sake of greater simplicity during the preparation steps, the magnets 4 preferably assume a parallelepiped shape having predefined dimensions on the basis of the motor torque performance to be obtained.

Further, as described in the foregoing, the depth of the magnets 4 is predefined and equal for all and, given the dimensioning, the insertion of a magnet 4 through the sequence of through-cavities 2b determines the forming of a module 5 in "magnetised" configuration.

A module 5, i.e. a subgroup of the plurality of discs 2 located in sequence to form a rotor 1 has two possible configurations: a "magnetised" configuration, in which at least one cavity 2b of each polar sector 2a of each disc 2 is crossed by at least a magnet 4 and an "empty" configuration, in which there are no magnets 4 present internally of the module 5.

A module 5 in this last configuration can also contain a single disc 2, but preferably will contain an equal number to a module 5 in the "magnetised" configuration so as to make the replacement operations between the modules 5 simpler for a change in the performance of the motor torque, as the depth of the rotor 1 is a non-variable predetermined dimension.

In an alternative embodiment, the modules 5 can have different depths so as to accommodate, in one or more cavities 2b, one or more magnets 4 inserted in sequence. For example, there could be a first module 5 in which in one or more cavities 2b two magnets 4 are present in sequence ("wide" module 5) and a second module 5 in which, in one or more cavities, 2b, only one magnet is inserted ("narrow" module 5). By placing a plurality of "narrow" modules 5 and "wide" modules 5 in sequence, a rotor 1 of the desired dimensions is obtained. In a variant of the alternative embodiment it is possible to realise two or more depth measurements of the magnets 4 and insert one or more in the cavities 2b of the modules according to needs.

In other words, the magnets 4 and the module can have depths that are different to one another.

Any modifications or variants which, in the light of the description, are obvious to the person skilled in the sector, must be considered to fall within the scope of protection established by the present invention, according to considerations of technical equivalence.

The invention claimed is:

1. A rotor of a variable-reluctance synchronous motor comprising a plurality of identically shaped discs arranged adjacent to one another in sequence along an axis of rotation and along a total depth of the rotor that extends axially from one end of the rotor to the other, the identically shaped discs being identical in shape and orientation to one another so that all features extending axially through discs that make up the total depth of the rotor align exactly with one another,
   wherein each of said discs is a lamination and includes a plurality of apertures extending axially therethrough,
   wherein the shape and arrangement of the plurality of apertures in each disc is identical for adjacently oriented discs,
   wherein the identically shaped discs are arranged in a plurality of equally sized sub-groups of said discs arranged in sequence along said axis of rotation such that each sub-group includes an equal number of laminations and each sub-group thereby extends an equal sub-group axial depth along the total depth of the rotor,
   wherein each of the plurality of apertures in adjacently oriented discs are aligned with one another so that each of the plurality of apertures extends axially through the adjacently oriented discs,
   wherein each of said discs is angularly sub-divided into a plurality of polar sectors, each of said polar sectors having exactly two identically dimensioned through-cavities radially aligned with one another, each through-cavity of the two radially aligned through cavities for housing at least a magnet,
   wherein each magnet has a parallelepiped shape having predefined dimensions, and all the magnets are identical in shape and size with one another,
   wherein each magnet has a predefined depth that is equal to one another, said depth being smaller than the total depth of the rotor, and each magnet having a section area perpendicular to the axis of rotation that is equal to or smaller than an access area to said through-cavity, and
   wherein the access area of each axially aligned through-cavity is the same between adjacent discs and extends between the plurality of discs forming a cavity therethrough, the cavity extending parallel to the axis of rotation along the depth of the rotor.

2. The rotor of a variable-reluctance synchronous motor according to claim 1, wherein said magnets are arranged symmetrically with respect to said rotation axis.

3. The rotor of a variable-reluctance synchronous motor according to claim 1, wherein said magnets have a predefined depth that is a multiple or sub-multiple of said predefined depth.

4. The rotor of a variable-reluctance synchronous motor according to claim 1, wherein the plurality of polar sectors comprises four polar sectors, with each polar sector comprises exactly two through-cavities for a total of eight through-cavities for each of the identically shaped discs.

5. The rotor of a variable-reluctance synchronous motor according to claim 1, wherein each sub-group of said discs arranged in sequence along said parallel direction to said axis of rotation defines a module of the rotor, the module being configured in a first empty configuration in which the module is lacking said magnets within adjacent axially aligned through-cavities comprising the module or a second magnetized configuration in which the module contains at least one of said magnets for each polar sector; said rotor being formed by one or more of said modules in the empty configuration and one or more of said modules in the magnetized configuration, with arrangement of the one or more of said modules in the empty configuration and the one or more of said modules in the magnetized configuration in relation to one another determined based on a desired performance of the motor.

6. The rotor of a variable-reluctance synchronous motor according to claim 1, wherein each of said magnets has a complementarily-shaped section area with respect to an opening of said through-cavity.

7. The rotor of a variable-reluctance synchronous motor according to claim 1, wherein each through-cavity is arranged along a radial axis of maximum reluctance and wherein each polar sector is defined between two consecutive radial axes of minimum reluctance.

8. A motor comprising a stator and a rotor according to claim 1, wherein said rotor rotates about said axis of rotation and is operatively coupled to said stator so as to form a variable-reluctance synchronous motor.

9. The rotor of a variable-reluctance synchronous motor according to claim 1, wherein the rotor is configured in a condition in which one magnet is inserted in each polar sector to a first depth extending through said through-cavity of adjacent discs and that is smaller than the total depth of the rotor or a configuration in which, instead of the one magnet extending through said through-cavity of adjacent discs, each of a plurality of said magnets is inserted in sequence extending through said through-cavity of adjacent discs along a parallel direction to said axis of rotation and axially aligned with one another to a second depth that is smaller than the total depth of the rotor, with the sequence being determined based on a desired performance of the motor.

10. The rotor of a variable-reluctance synchronous motor according to claim 1, wherein each polar sector of each disc comprises an identically shaped and arranged portion of the plurality of apertures extending axially therethrough.

\* \* \* \* \*